(12) United States Patent
Hetzler (10) Patent No.: US 10,146,652 B2
(45) Date of Patent: Dec. 4, 2018

(54) RESILIENT DISTRIBUTED STORAGE SYSTEM

(71) Applicant: International Business Machines Corporation, Armonk, NY (US)

(72) Inventor: Steven R. Hetzler, Los Altos, CA (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 15/041,999

(22) Filed: Feb. 11, 2016

(65) Prior Publication Data
US 2017/0235631 A1    Aug. 17, 2017

(51) Int. Cl.
G06F 11/10    (2006.01)
G06F 11/20    (2006.01)

(52) U.S. Cl.
CPC ...... *G06F 11/2097* (2013.01); *G06F 11/2094* (2013.01)

(58) Field of Classification Search
CPC . G06F 11/1076; G06F 11/108; G06F 11/1096
USPC ........................................................ 714/6.24
See application file for complete search history.

(56) References Cited

U.S. PATENT DOCUMENTS

| | | |
|---|---|---|
| 6,351,838 B1 | 2/2002 | Amelia |
| 7,734,643 B1 | 6/2010 | Waterhouse et al. |
| 8,364,633 B2 | 1/2013 | Aahlad et al. |
| 8,458,287 B2 | 6/2013 | Ozzie et al. |
| 8,495,036 B2 | 7/2013 | Calder et al. |
| 8,620,884 B2 | 12/2013 | Calder et al. |
| 8,738,855 B2 | 5/2014 | De Spiegeleer et al. |
| 8,914,513 B2 | 12/2014 | Dutta et al. |
| 9,075,851 B2 | 7/2015 | Kilian et al. |
| 2001/0018729 A1* | 8/2001 | Johnson ............. G06F 11/1076 711/114 |

(Continued)

FOREIGN PATENT DOCUMENTS

| | | |
|---|---|---|
| EP | 1343087 A2 | 9/2003 |
| EP | 2273683 A2 | 1/2011 |
| WO | 0073906 A1 | 12/2000 |

OTHER PUBLICATIONS

List of IBM Patents or Patent Applications Treated as Related Form.

(Continued)

*Primary Examiner* — Chae M Ko
(74) *Attorney, Agent, or Firm* — Sherman IP LLP; Kenneth L. Sherman; Steven Laut (57) ABSTRACT

One embodiment provides a method for storing data in a data storage system. The method comprises copying a data set into a buffer in a data storage center in response to receiving a write command for the data set; updating a content map; and sending to a second data storage center a parity write command for the data set. The method continues with copying the data set into a buffer in the second data storage center; updating a second content map; and sending to the first data storage center an acknowledgement indicating the parity write command is complete. Then in response to receiving the acknowledgement, updating the first content map; moving the data set to a storage unit in first data storage center; and acknowledging the data set is protected. Finally, releasing the data set from the first buffer; and updating the first map content.

19 Claims, 8 Drawing Sheets

(56) References Cited

U.S. PATENT DOCUMENTS

| | | | |
|---|---|---|---|
| 2002/0194340 A1 | 12/2002 | Ebstyne et al. | |
| 2008/0104375 A1* | 5/2008 | Hansen | G06F 9/30014 |
| | | | 712/220 |
| 2008/0140919 A1* | 6/2008 | Torabi | G06F 12/0207 |
| | | | 711/103 |
| 2008/0222480 A1* | 9/2008 | Huang | H03M 13/1191 |
| | | | 714/752 |
| 2008/0222481 A1 | 9/2008 | Huang et al. | |
| 2009/0049050 A1* | 2/2009 | Whitehead | G06F 17/30067 |
| 2012/0084506 A1 | 4/2012 | Colgrove et al. | |
| 2012/0131383 A1 | 5/2012 | Galloway et al. | |
| 2012/0198195 A1* | 8/2012 | Wylie | G06F 11/1076 |
| | | | 711/170 |
| 2014/0040702 A1* | 2/2014 | He | G06F 11/1076 |
| | | | 714/766 |
| 2014/0064048 A1* | 3/2014 | Cohen | G06F 3/0613 |
| | | | 369/47.15 |
| 2014/0215209 A1 | 7/2014 | Chacko | |
| 2014/0380125 A1 | 12/2014 | Calder et al. | |
| 2014/0380126 A1* | 12/2014 | Yekhanin | G06F 11/10 |
| | | | 714/766 |
| 2015/0020172 A1* | 1/2015 | Bohnenberger | G06F 17/30595 |
| | | | 726/5 |
| 2015/0113319 A1* | 4/2015 | Miyamae | G06F 3/0689 |
| | | | 714/6.24 |
| 2015/0154418 A1 | 6/2015 | Redberg | |
| 2016/0034354 A1 | 2/2016 | Hashimoto et al. | |
| 2016/0380650 A1* | 12/2016 | Calder | G06F 11/1076 |
| | | | 714/766 |
| 2017/0220415 A1 | 8/2017 | Hashimoto et al. | |

OTHER PUBLICATIONS

Li, M. et al., "Toward I/O-Efficient Protection Against Silent Data Corruptions in RAID Arrays", Proceedings of the 30th Symposium on in Mass Storage Systems and Technologies (MSST), Jun. 2-6, 2014, pp. 1-2, IEEE, United States.

Mell, P., et al., "The NIST Definition of Cloud Computing", National Institute of Standards and Technology Special Publication 800-145, Sep. 2011, pp. 1-7, U.S. Department of Commerce, United States.

* cited by examiner

RESILIENT DISTRIBUTED STORAGE SYSTEM

The present invention generally relates to a method for storing data in a data storage system to protect against data loss with data storage centers.

BACKGROUND

Protecting against data center loss in a data storage system is most commonly achieved using data replication. Data is written to a first data center, then copied to one or more data centers for protection. With two data centers, the system is protected against the loss of any one data center. Typical configurations use three data centers, as they rely on the replication to protect against certain failures local to a data center. With three data centers, data is protected against the concurrent loss of one data center and one further error in one of the remaining data centers. Such a system is expensive, as it multiplies the storage and network capacity required. Another prior method for protection is to use an erasure code spread across the data centers. Some examples include symmetric code, such as 6+6P (6 data and 6 parity) and 7+5P (7 data and 5 parity). Data in a first data center is encoded locally into the erasure code, and the spread across the data centers. Both 6+6P and 7+5P have 12 storage elements in a code stripe. These can be spread across 3 data centers by placing 4 elements on each data center. Both of these codes are more efficient than replication, but have a significant performance impact. Data is encoded into the stripe in a first data center, a subset of the elements are stored on the first data center, and the remaining subsets are stored on the other data centers. This means that data is not protected against any type of loss (local or data center) until the entire code stripe is stored. This synchronous process uses WAN bandwidth for every write and suffers from round-trip latency. Further, such erasure codes provide very limited protection in cloud environments. They suffer from long reconstruct/rebuild times as such recovery requires data be transferred over the WAN. Cloud systems operate at very large scale, and there are large numbers of storage components in each data center. Thus, the probability of a data center having some component failed, off line or otherwise unavailable is very high. It is therefore critical to have strong local protection in addition to data center loss protection.

SUMMARY

Embodiments of the invention relate to a data storage system comprising a plurality of data storage centers, each comprising: a set of storage units; an encoder configured to encode local and global protection information; a parity map data structure configured to dynamically identify which data storage centers in the plurality of data storage centers participate in a given parity group; a content map data structure configured to identify where among the plurality of data storage centers that data is stored and how to recover the data when a given data storage center is unreachable; and a buffer configured to temporarily store data prior to loading into the set of storage units. In the system, a given data storage center of the plurality of data storage centers is configured as a data parity storage center. Further, each content map comprises: a data set field indicating a data set being stored; a source field indicating from which data storage center the data set originates; a location field indicating whether the data set is in a buffer or in a storage unit; a state flag field indicating whether a local parity of the data set is complete, whether a global copy of the data set is complete and whether a global protection of the data set is complete; a recovery flag field indicating whether the data set is to be forwarded to the parity data center; a recovery destination field indicating a location of the parity data center; and a recovery source field indicating a given data storage center of the plurality of data storage centers for recovery. Each parity map comprises: an identification of the first data storage center configured to store the data set; an identification of the second data storage center configured to store the data set; and an identification of the parity data center configured to maintain parity for the plurality of data storage centers. Moreover, each data storage center is configured to: in response to receiving a write command for the first data set: copy the data set into a buffer in the given data storage center; update a content map in the given data storage center; send an acknowledgement indicating the write command is complete; and send to another second data storage center a parity write command for the first data set. Each data storage center is further configured to: in response to receiving an acknowledgement indicating the parity write command is complete: update the content map in the given data storage center; move the data set in the buffer to a storage unit in the given data storage center; send an acknowledgement indicating the data set is protected against loss; and release the data set from the buffer update the map content in the given data storage center.

In another embodiment, a method for storing data in a data storage system comprises: in response to receiving a write command for a first data set, copying the first data set into a first buffer in a first data storage center; updating a first content map in the first data storage center; sending an acknowledgement indicating the write command is complete; and sending to a second data storage center a parity write command for the first data set. The method further comprises: copying the first data set into a second buffer in the second data storage center; updating a second content map in the second data storage center; and sending to the first data storage center an acknowledgement indicating the parity write command is complete. The method further comprises: in response to receiving the acknowledgement indicating the parity write command is complete, updating the first content map; moving the first data set in the first buffer to a first storage unit in first data storage center; and sending an acknowledgement indicating the first data set is protected against loss. Finally, the method comprises: releasing the first data set from the first buffer; and updating the first map content.

These and other features, aspects and advantages of the present invention will become understood with reference to the following description, appended claims and accompanying figures.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Figure 1:
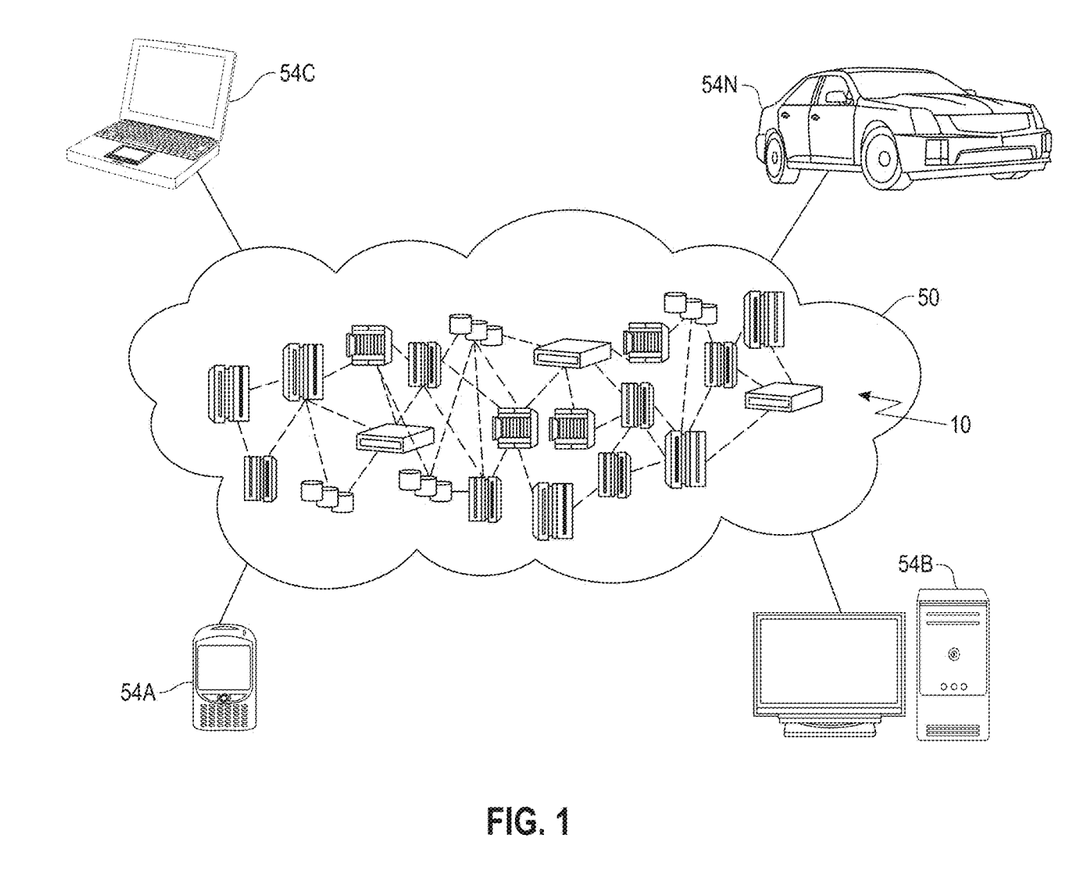
FIG. 1 depicts a cloud computing environment, according to an embodiment.

Referring now to FIG. 1', an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
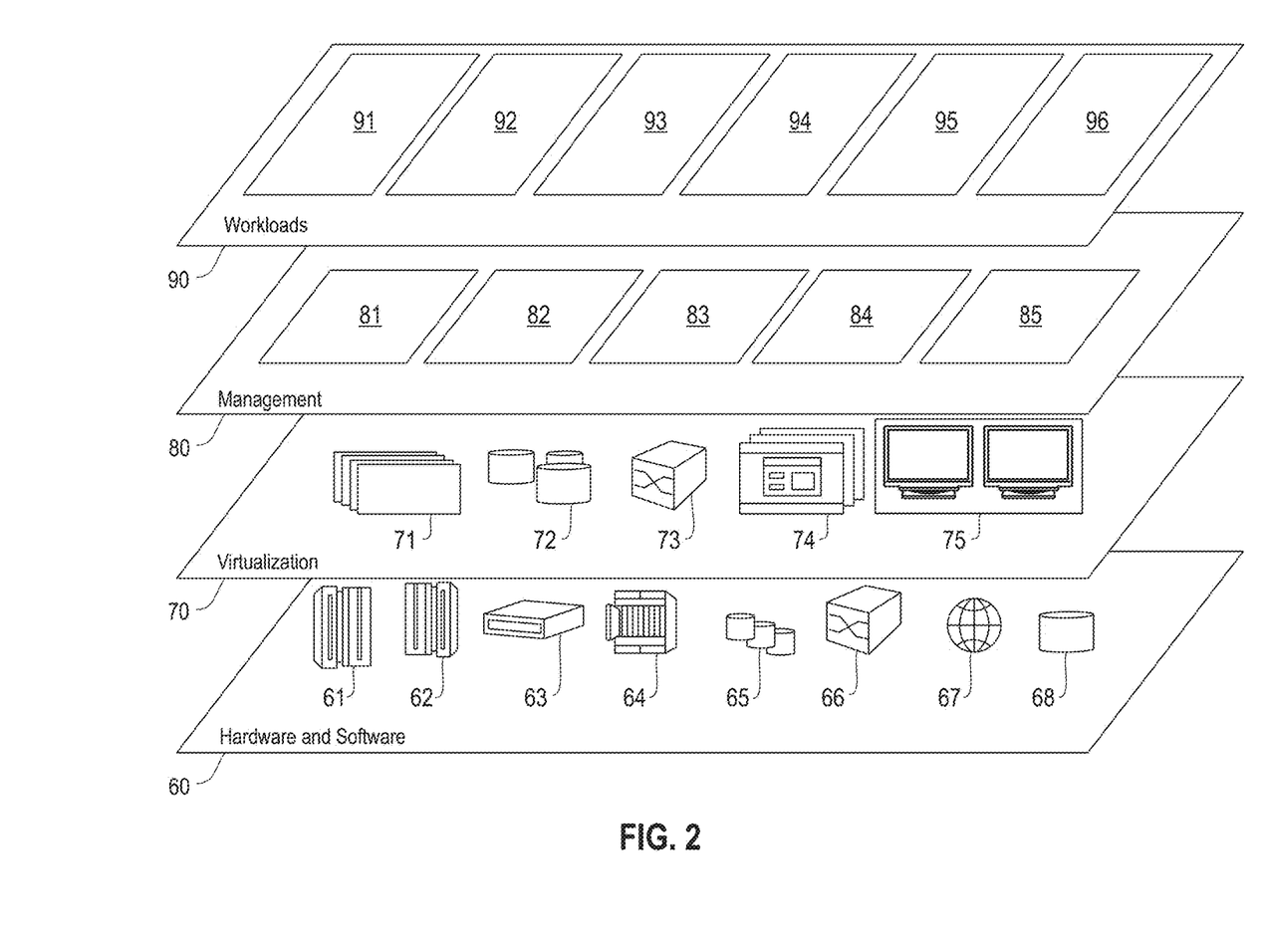
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95 and verifying historical artifacts in disparate source control systems 96. As mentioned above, all of the foregoing examples described with respect to FIG. 2 are illustrative only, and the invention is not limited to these examples.

It is understood all functions of one or more embodiments as described herein may be typically performed in the computing environment 50 (FIG. 1), the network 300 (FIG. 3), or performed by the system 400 (FIG. 4), which can be tangibly embodied as hardware processors and with modules of program code. However, this need not be the case. Rather, the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
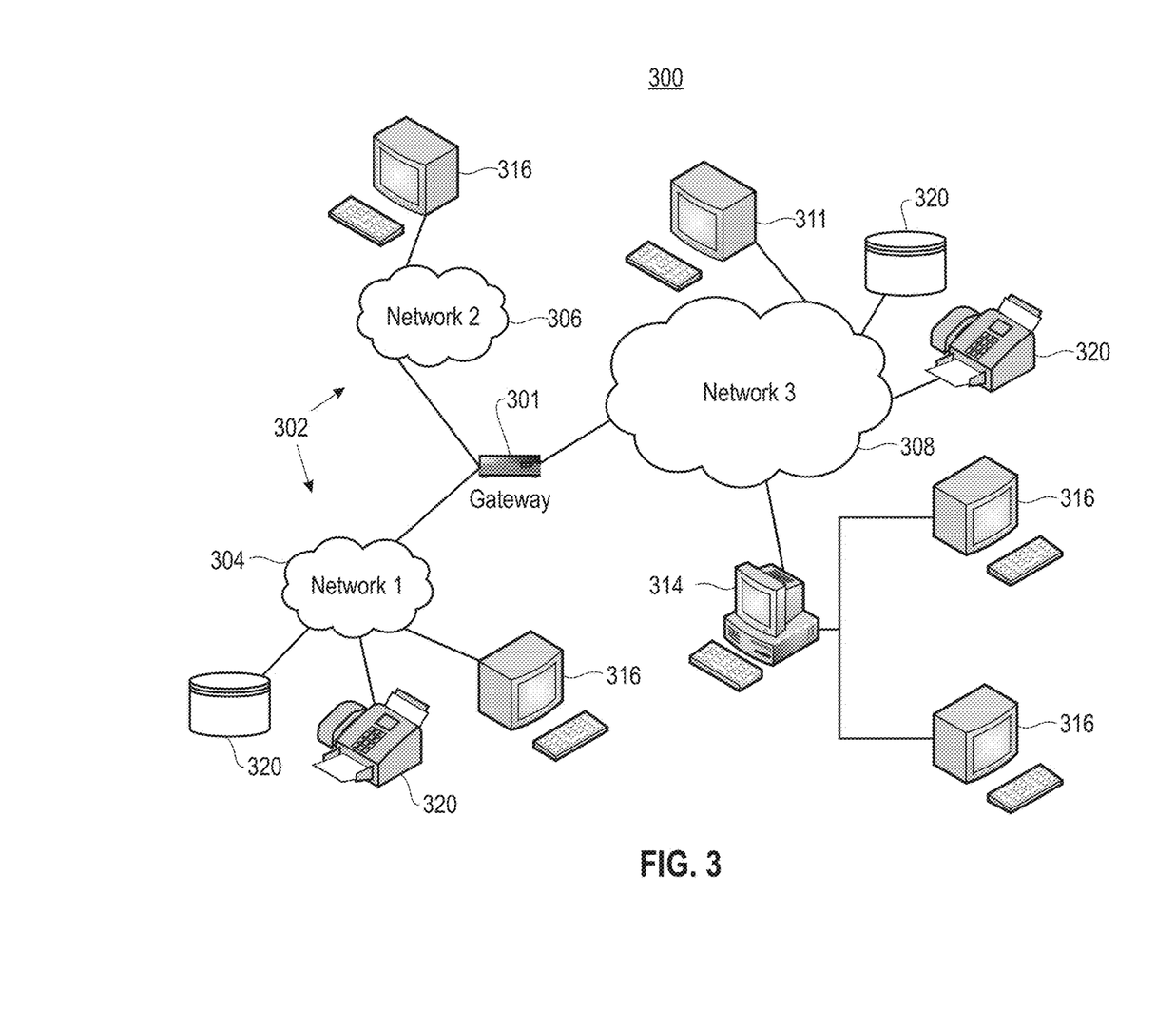
FIG. 3 is a network architecture for verifying historical artifacts in disparate source control systems, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc. In one embodiment, the network architecture 300 employs a POSIX® based file system.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
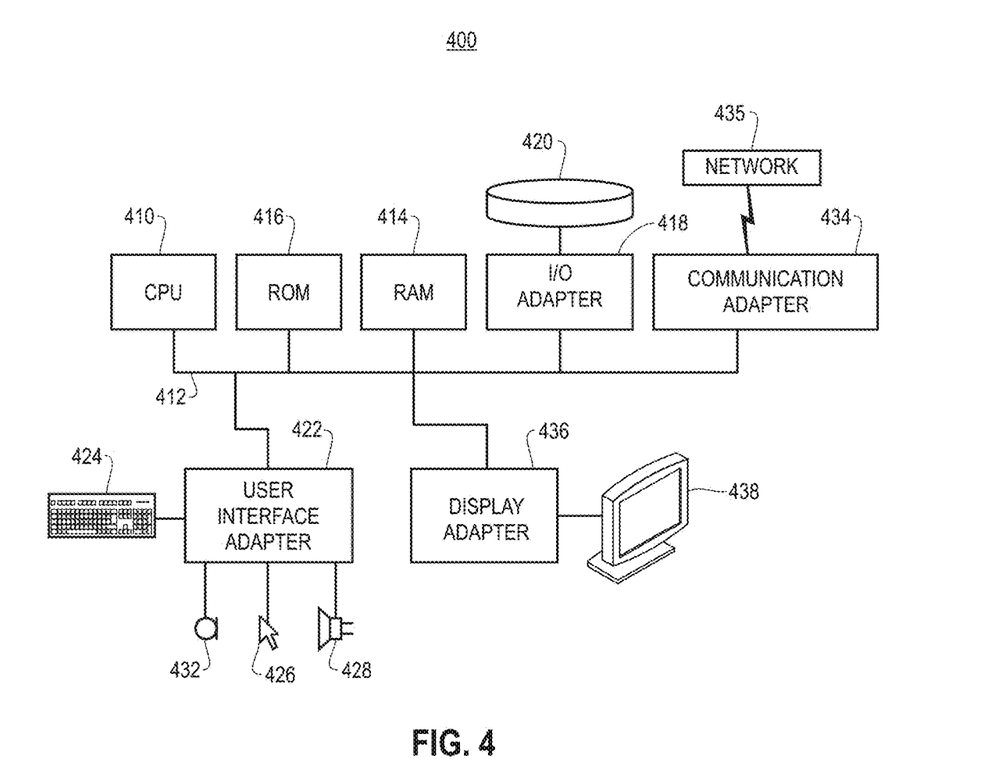
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
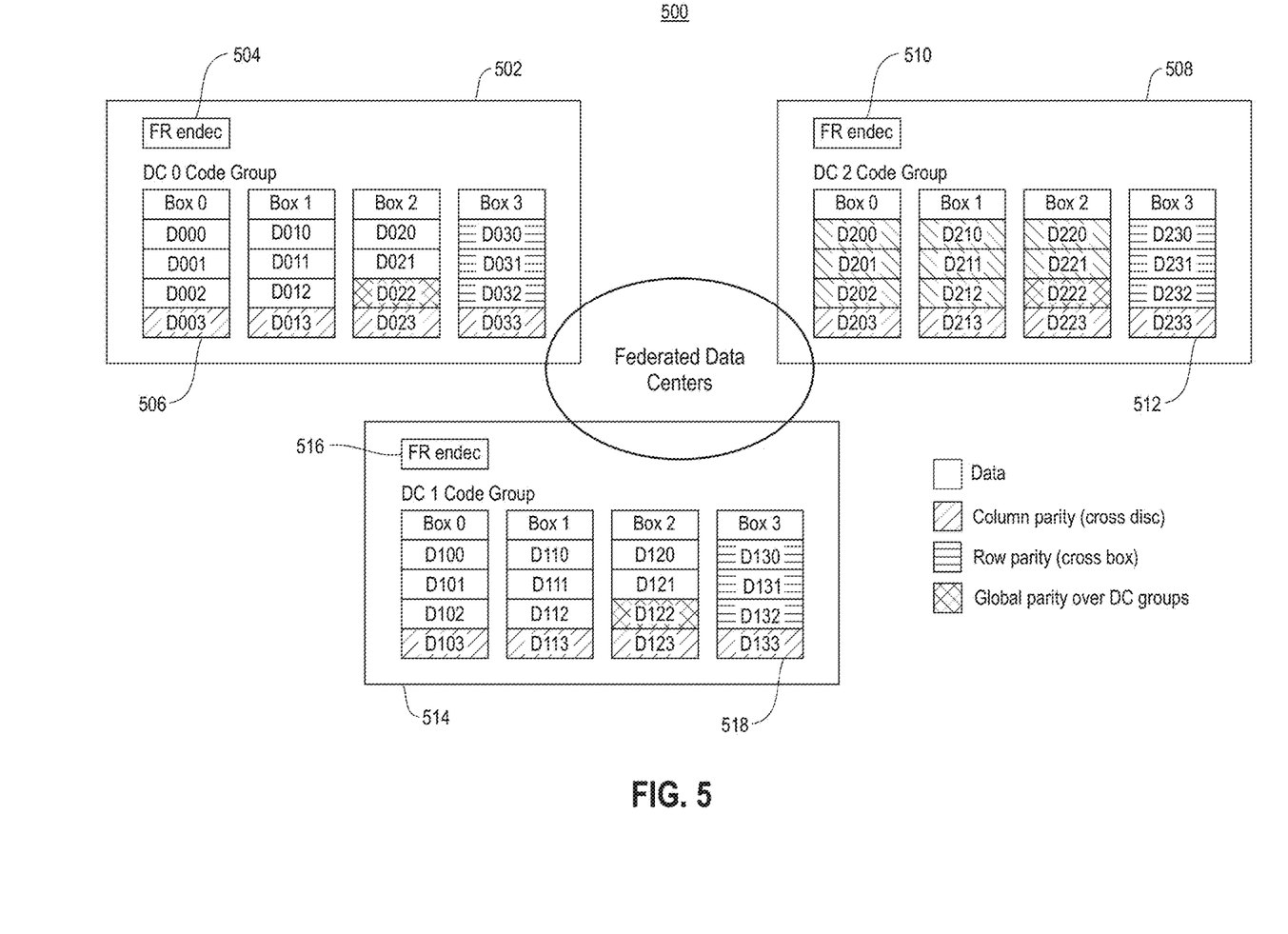
FIG. 5 shows a representative distributed data storage system, according to one embodiment.

FIG. 5 shows a representative distributed data storage system 500, according to one embodiment. The system 500 illustrates a set of federated data centers 502, 508 and 514, protected by local and global erasure codes. The global erasure code has data sets on two of the data centers, and parity sets on the third data center forming the global erasure code. While FIG. 5 details three data centers 502, 508 and 514, two or more data centers is the preferred embodiment. Any number of data centers can hold the parity sets so long as there is at least one data center which has data sets. Each data center also protects the local data sets with additional parity information, forming the local erasure codes. Each data center has its own encoder/decoder 504, 510 and 516, for managing the local and global codes and handling associated state information.

The data storage centers 502, 508 and 514 are connected over a network, such as a WAN. Each data storage center includes a plurality of data units 506, 512 and 518, shown as boxes labeled "Dxxx" where "x" identifies a numerical value of a particular unit (e.g., D233). The data units 506, 512 and 518 are further grouped into sets labeled "Box n." These indicate some common failure domain in the data center, such as a JBOD (just a bunch of discs), or a rack, etc. As shown in FIG. 5, a layer of protection local to each data storage center is present. In this embodiment, these are first-responder-type erasure codes. The row, columns and global parities provide protection for local data failures. The data units 506, 512 and 518 are protected against data storage center failure by a cross-data-center code, such as parity.

While it is possible to have a fixed parity mapping, in general it is beneficial to support a dynamic parity map. This may be achieved via maintaining a data storage center parity group map which identifies which data storage centers 502, 508 and 514 and data sets participate in a parity group, as well as what role each data storage center plays (e.g., holds data, holds parity for the group, etc.). Each data storage center 502, 508 and 514 has a parity map for the parity groups to which it participates. The parity map should be set and confirmed by all member data storage centers prior to allowing write access to any of the data sets in the range.

The system 500 also includes a content map for each data storage center. The content map contains sufficient information for each data storage center 502, 508 and 514 to know where a given data set is stored and how to recover it in the case of a data storage center loss (e.g., offline, power outage, natural disaster, etc.).

Figure 6:
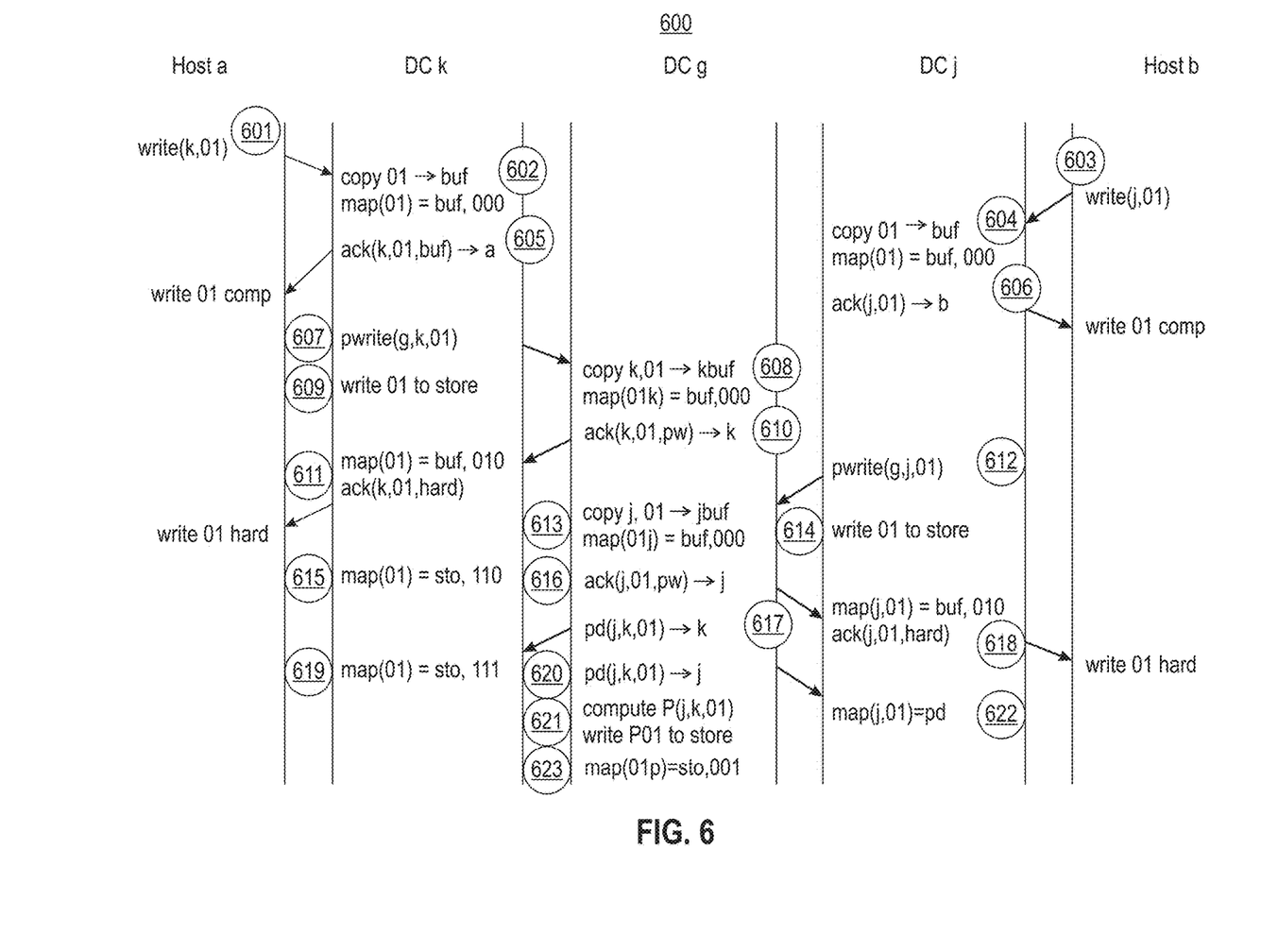
FIG. 6 shows an example workflow for storing data in a three data center data storage system, according to one embodiment.

FIG. 6 shows an example workflow 600 for storing data in a three data storage center (502, 508 and 514, see FIG. 5) data storage system. The storage process differs from prior art in that it moves data asynchronously between data storage centers and maintains the parity/data map information asynchronously, all without a centralized controller. The data mapping in FIG. 6 allows data sets of with the same numeric identifier on different data storage centers, as the numeric identifier is only a portion of the data set ID. A full data set ID includes the data storage center identifier, making each data set unique.

In FIG. 6 the data storage centers are identified as "DC k," "DC g" and "DC j" as determined by the data center parity map, with "DC g" as the parity data storage center. "Host a" is associated with data storage center "DC k" while "Host b" is associated with data storage center "DC j." At step 601, Host a issues a write command for data set 01 to data storage center DC k. At step 602, data set 01 is copied into a buffer in DC k. The buffer is preferably non-volatile, and may be flash, HDD or other such storage. In this embodiment, the content map entries are (location, flags), so the map for DC k is set to buffer, pd=0, gc=0, gd=0. In this configuration, the content map means that data set 01 for data storage center DC k is in the buffer in DC k, has not been forwarded to data storage center DC g and the parity group is incomplete.

At step 605, an acknowledgement is sent from data storage center DC k to Host a indicating the write of data set 01 is complete, although not hardened (i.e., the data is protected against data center loss). In situations where eventual hardening is acceptable, as opposed to immediate hardening, Host a can treat the acknowledgement as a full write complete. If Host a requires confirmation of the hardening of data set 01, Host a will wait for a subsequent acknowledgement (step 611). At step 603, Host b writes data set 01 to data storage center DC j. In this embodiment, step 603 need not follow step 602 and may occur at any time. In FIG. 6, step 603 is shown merely to indicate that the operations from different hosts are asynchronous. Steps 604 and 606 on data storage center DC j are similar to steps 602 and 605.

At some time following step 602, data storage center DC k issues a parity write (pwrite) command of data set 01 to data storage center DC g, shown as step 607. In FIG. 6 this is shown following step 605, but can occur any time after step 602. The pwrite command includes the data from data set 01, but differs from the normal write command in that informs the parity data storage center (DC g) that the contents are part of a global parity group and identifies the source data storage center. At step 608, data set 01 is copied into buffer space in data storage center DC g for data storage center DC k (data center DC g will note that the buffer is a pwrite from data storage center DC k). DC g is unable to complete a global parity computation for data set 01 until it receives a pwrite of data set 01 from data storage center DC j. The content map is updated to k, buf, 000, indicating the remote source (DC k). At step 610, the parity write is acknowledged to data storage center DC k. At step 611, data storage center DC k updates the map state for data set 01 to buf, 010 since a copy of data set 01 is now at DC g. At this point, data storage center DC k may inform Host a that data set 01 is hardened to data center loss.

At step 609, data storage center DC k may have sufficient data that it can move data set 01 from the buffer to the storage. In one embodiment, this can be part of a streaming, asynchronous or other update of the local parity code. Writing data set 01 to storage can occur at any time after step 602. At some later time, at step 615 the write to the storage and the local parity group is complete, and the map is updated to sto, 110. At this point data set 01 can be freed from the buffer in data storage center DC k. At step 612, data storage center DC j issues the parity write command for data set 01 to data storage center DC g (similar to step 607). At step 613, data set 01 is copied into a buffer location for data storage center DC j, and the map at DC gis updated to j, buf, 000. At step 616, data storage center DC g acknowledges the pwrite to data storage center DC j.

Once data storage center DC g has data sets from both data storage centers DC k and DC j, DC g can inform the other data storage centers via a parity done message. This occurs at steps 617 and 620. When a data storage center receives a parity done (pd) message (e.g., data storage center DC k at step 619), it sets the pd flag in the associated map entry. At step 621, data storage center DC g has enough information to compute the parity for data set 01. DC g can write this to storage, as in step 609. The pd flag for the map entry associated with data set 01 is set (step 623). The local parity computation can be computed asynchronously, as in step 609.

In one embodiment, local erasure codes may be processed asynchronously from the global erasure code. Further, network bandwidth overhead for writing data is 100 percent, that is, every piece of data is sent over then network twice—once to the target data storage center and once to the parity data storage center. This is one half (½) the network overhead of triple copy, which sends a given piece of data over the network three times. It is also more efficient than symmetric codes which require a minimum of 5/3 (167%) network bandwidth with three data storage centers.

The asynchronous protocol described herein allows data to be recovered in the event of a data storage center loss. In one embodiment, there is a mechanism for redirecting host requests in the event of a data storage center failure. This could be a list of data centers held at the hosts, handled via name resolution (e.g. DNS) redirects, or other such mechanism. It is the state information provided in the parity and content maps that allows the data to be recovered so long as the data has been sent to at least one other data storage center. It is preferable to redirect requests to the parity data storage center, but this may not always be practical. A pread command (parity read), includes the request source data storage center identifier, the requesting host identifier, and the data set identifier. The return includes the data set, a flag indicating if the data set is parity or raw data, and a flag indicating that the data has been directly returned to the host.

Figure 7:
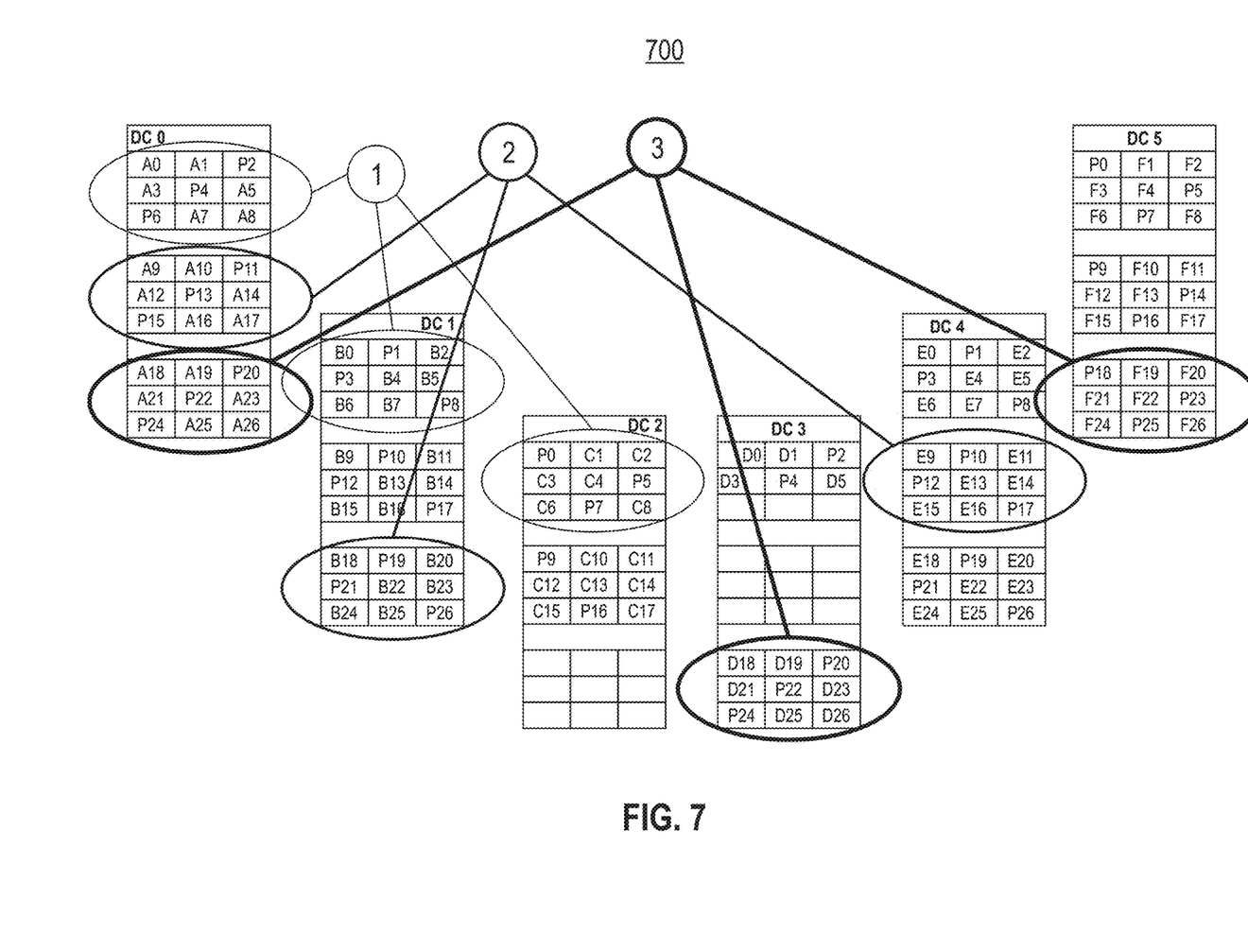
FIG. 7 depicts a de-clustered data storage center configuration, according to an embodiment.

FIG. 7 depicts a de-clustered data storage center configuration 700, according to an embodiment. This embodiment assigns portions of various data centers to global erasure code groups and has many advantages, including load balancing and limiting recovery required for a particular data center when a data center is lost, offline, etc. The system can be realized with various erasure codes. There are benefits to having strong protection local to data storage centers for it minimizes the network bandwidth associated with recovery using remote data storage centers. First responder (FR) codes are very powerful in this regard. In the example FIG. 5, the FR code has a minimum distance of six (6) to unit failure. That is, the system can recover from the loss of five (5) data set units without referring to the global erasure code. There are also many options for the global erasure code, including the number of data storage centers in the code and the number which contain global parity information.

Error! Reference source not found. shows three data storage centers 502, 508 and 514 with one (1) parity (2+1P), but could be 4+1P, 5+2P, etc. The local erasure code for the parity data storage center can be computed from only the data sets transferred from the other storage centers. The parity in the other centers need not be transferred. Parity rotation can also be used to provide load balancing if desired. It can be uniform or non-uniform. The latter may be desirable if two of the data storage centers are, for example, in metro areas, and the third resides in a different geographical location. In such a scenario, fixing the parity in the remote data storage center avoids the long haul network latency for metro host data. The parity map supports any type of parity rotation.

Moreover, the system can be spread out across sets of data storage centers to improve load balancing, handle a data storage center count larger than the number of data storage centers in a parity group, as well as aid in recovery from missing data storage centers. This is shown in FIG. 7. Dynamic mapping can also be used to grow the mapping as data arrives and provide features such as load balancing, thin provisioning, etc. The system can also handle writes when a data storage center holding parity for a group is missing by redirecting pwrites to a non-parity data center, or by assigning to free space in another data center. Consider global erasure code group 1 in FIG. 7. If data storage center 1 (DC 1) is missing, then parity writes, such as P1, P3, and P8, could be redirected to free space on data storage center DC 3. Alternately it could be posted free space on data storage center DC 2. The recipient data storage center: puts the pwrite data in the buffer; sets the recovery flag in the content map; sets the recovery destination identifier to provide the pwrite command; sets the recovery source identifier to source data storage center; and returns the hard message to the source data storage center since the copy is stored.

If, as in this example, the data storage center loss is temporary, this data storage center can process all the recovery data and forward it to the parity data storage center (DC g, see FIG. 6). Clean up includes having the parity data storage center send a write hard message to the source data storage center so the source data storage center can clean up its content map. Data may also be redirected to the parity data storage center, which then processes the write command. The system could process the command as a pwrite, and just use the recovery path to return data to the missing data storage center. Alternatively, it may be advantageous to initially assume the outage is temporary, and hold a copy of the data set in the buffer of the receiving data storage center for an extended period of time. The parity data storage center can set the dr flag for this data. The receiving data storage center may also store a timestamp to aid in deciding when an outage (e.g., lack of communication with a parity data storage center) is long enough to warrant removing the data from the buffer. The dynamic map construct aids in this embodiment, as the maps for new data sets can be created using maps from other data storage centers.

Load balancing between data storage centers should keep the write rates reasonably similar in the various data storage centers. However, it is still possible for the write skew to become large enough to put pressure on the buffer space in parity data storage center(s). This could be mitigated by flushing the partially completed data sets to the storage in a given data storage center. In the scenario of three data storage centers in FIG. 5, this would be writing buffer data one of the data storage centers directly to the storage without completing the parity calculation. An additional state in the content map, pp (partial parity) can be used to flag such data sets. Once the slower data storage center catches up and/or comes back online, the local parity can be either updated in place such as by read-modify-write, or the parity group may be relocated.

Figure 8:
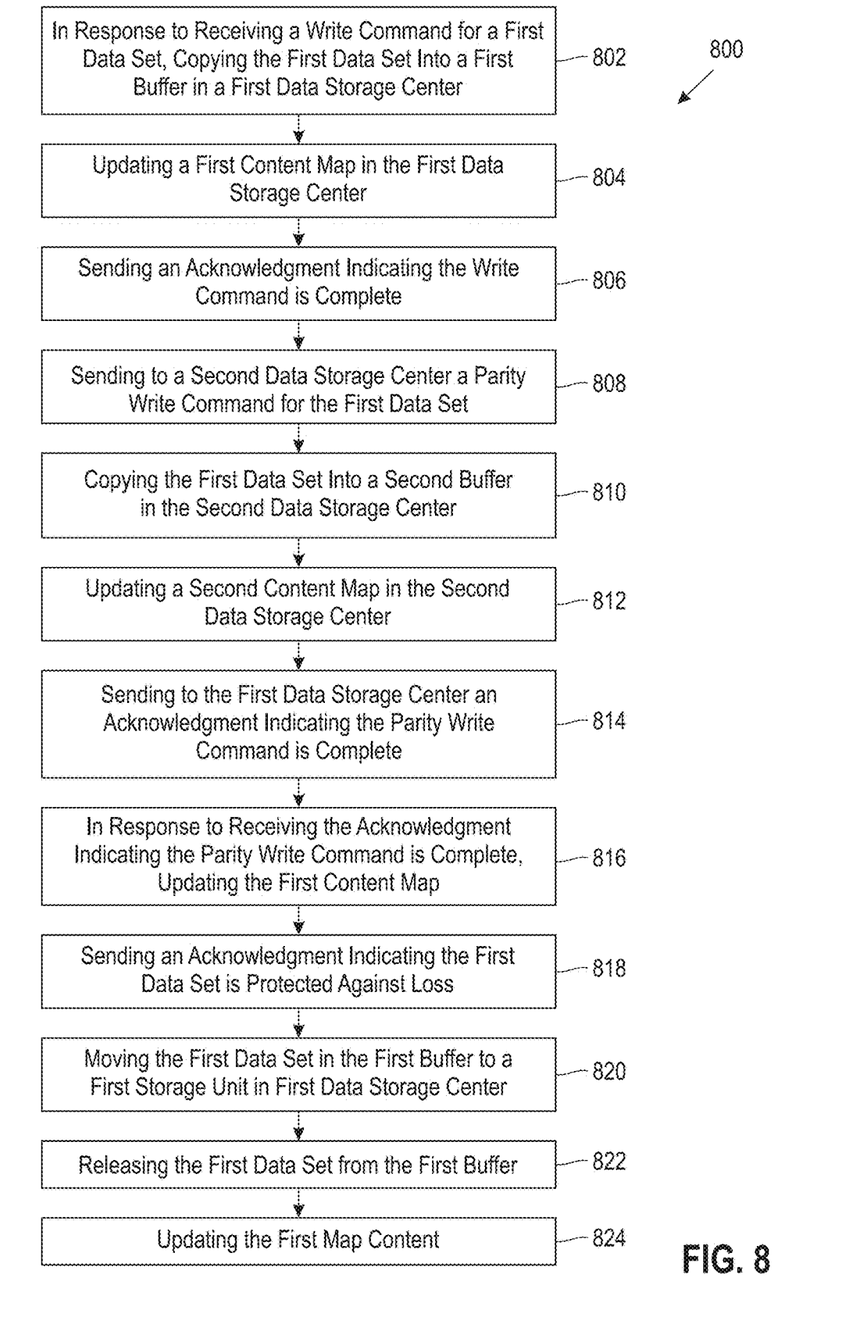
FIG. 8 illustrates a block diagram for a method for storing data in a data storage system, according to one embodiment.

FIG. 8 illustrates a block diagram for a method 800 for storing data in a data storage system, according to one embodiment. The method 800 begins with block 802, copying the first data set into a first buffer in a first data storage center in response to receiving a write command for a first data set. The write command could come from, for example, Host a or Host b (see FIG. 6). After copying the data set into a buffer, block 802 is complete and the method 800 continues with block 804, updating a first content map in the first data storage center. After updating, the method 800 continues with step 806, sending an acknowledgement message to the write command initiator (Host a, Host b, etc.) indicating the write command is complete. Upon completion of block 806, the method 800 continues with block 808, sending a second data storage center a parity write command for the first data set and then 810 copying the first data set into a second buffer in the second data storage center.

The method 800 continues with block 812, updating a second content map in the second data storage center and then block 814, sending to the first data storage center an acknowledgement indicating the parity write command is complete. Further, the method 800 continues with block 816, updating the first content map residing in the first data storage center in response to receiving the acknowledgement indicating the parity write command at the second data storage center is complete. Then block 818 is performed, sending an acknowledgement to the write command initiator indicating the first data set is protected against loss (i.e., hardened). Next, the method 800 moves to block 820, moving the first data set in the first buffer to a first storage unit in the first data storage center. Next, the method 800 moves to block 822, releasing the first data set from the first buffer and then block 824, updating the first map content for the given data set.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data storage system; comprising:
a plurality of data storage centers, each comprising:
a set of storage units;
an encoder configured to encode local protection information and global protection information;
a parity map data structure configured to dynamically identify which data storage centers in the plurality of data storage centers participate in a given parity group;
a content map data structure configured to identify where among the plurality of data storage centers that data is stored and how to recover the data when a given data storage center is unreachable; and
a buffer configured to temporarily store data prior to loading into the set of storage units,
wherein the data is moved asynchronously between the plurality of data storage centers, parity for the plurality of data storage centers is maintained asynchronously by at least one parity data storage center, and each of the plurality of data storage centers is configured to issue a parity read command.

2. The system of claim 1, wherein a portion of available storage in a given data storage center of the plurality of data storage centers is configured as a parity data storage center.

3. The system of claim 2, each content map comprising:
a data set field indicating a data set being stored;
a source field indicating from which data storage center the data set originates;
a location field indicating whether the data set is in a buffer or in a storage unit; and
a state flag field indicating whether a local parity of the data set is complete, whether a global copy of the data set is complete and whether a global protection of the data set is complete.

4. The system of claim 3, each content map further comprising:
a recovery flag field indicating whether the data set is to be forwarded to the parity data center;
a recovery destination field indicating a location of the parity data storage center; and
a recovery source field indicating a given data storage center of the plurality of data storage centers for recovery.

5. The system of claim 4, each parity map comprising:
an identification of the first data storage center configured to store the data set;
an identification of the second data storage center configured to store the data set; and
an identification of the parity data storage center configured to maintain parity for the plurality of data storage centers.

6. The system of claim 5, wherein each data storage center is configured to:
in response to receiving a write command for the first data set:
copy the data set into a buffer in the given data storage center;
update a content map in the given data storage center;
send a first acknowledgement indicating the write command is complete; and
send to another second data storage center a parity write command for the first data set.

7. The system of claim 6, wherein each data storage center is further configured to:
in response to receiving an acknowledgement indicating the parity write command is complete:
update the content map in the given data storage center;
move the data set in the buffer to a storage unit in the given data storage center;
send a second acknowledgement indicating the data set is protected against loss; and release the data set from the buffer and update the map content in the given data storage center.

8. The system of claim 1, wherein the local protection information is an erasure code with a minimum Hamming distance greater than 1, the parity read command includes a request source data center identifier, a requesting host identifier and a data set identifier, and the parity read command returns: a data set flag indicating if the data set is parity or raw data, and a flag indicating that data has been returned to the requesting host.

9. A method for storing data in a data storage system; comprising:
   in response to receiving a write command for a first data set, copying the first data set into a first buffer in a first data storage center;
   updating a first content map in the first data storage center;
   sending a first acknowledgement indicating the write command is complete; and
   sending to a second data storage center a parity write command for the first data set;
   wherein the data storage system comprises a plurality of data storage centers, data is moved asynchronously between the plurality of data storage centers, parity for the plurality of data storage centers is maintained asynchronously by at least one parity data storage center, and each of the plurality of data storage centers is configured to issue a parity read command.

10. The method of claim 9, wherein:
    each data storage center comprises:
      a set of storage units;
      an encoder configured to encode local protection information and global protection information;
      a parity map;
      a content map; and
      a buffer configured to temporarily store data prior to loading into the set of storage units; and
      a portion of available storage in a given data storage center of the plurality of data storage centers is configured as a parity data storage center.

11. The method of claim 10, further comprising:
    copying the first data set into a second buffer in the second data storage center;
    updating a second content map in the second data storage center; and
    sending to the first data storage center an acknowledgement indicating the parity write command is complete.

12. The method of claim 11, further comprising:
    in response to receiving the acknowledgement indicating the parity write command is complete, updating the first content map;
    moving the first data set in the first buffer to a first storage unit in first data storage center; and
    sending a second acknowledgement indicating the first data set is protected against loss.

13. The method of claim 12, further comprising:
    releasing the first data set from the first buffer; and
    updating the first content map.

14. The method of claim 13, each content map comprising:
    a data set field indicating the data set being stored;
    a source field indicating from which data storage center the data set originates;
    a location field indicating whether the data set is in a buffer or in a storage unit; and
    a state flag field indicating whether a local parity of the data set is complete, whether a global copy of the data set is complete and whether a global protection of the data set is complete.

15. The method of claim 14, each content map further comprising:
    a recovery flag field indicating whether the data set is to be forwarded to the parity data storage center;
    a recovery destination field indicating a location of the parity data storage center; and
    a recovery source field indicating a given data storage center of the plurality of data storage centers for recovery.

16. The method of claim 13, each parity map comprising:
    an identification of the first data storage center configured to store the data set;
    an identification of the second data storage center configured to store the data set; and
    an identification of the parity data storage center configured to maintain parity for the plurality of data storage centers.

17. A system comprising a computer processor, a computer-readable hardware storage device, and program code embodied with the computer-readable hardware storage device for execution by the computer processor to implement a method comprising:
    in response to receiving a write command for a first data set, copying the first data set into a first buffer in a first data storage center;
    updating a first content map in the first data storage center;
    sending a first acknowledgement indicating the write command is complete;
    sending to a second data storage center a parity write command for the first data set;
    copying the first data set into a second buffer in the second data storage center;
    updating a second content map in the second data storage center;
    sending to the first data storage center an acknowledgement indicating the parity write command is complete;
    in response to receiving the acknowledgement indicating the parity write command is complete, updating the first content map;
    moving the first data set in the first buffer to a first storage unit in first data storage center;
    sending a second acknowledgement indicating the first data set is protected against loss;
    releasing the first data set from the first butler; and
    updating the first content map,
    wherein the system comprises a plurality of data storage centers, data is moved asynchronously between the plurality of data storage centers, a portion of available storage in a given data storage center of the plurality of data storage centers is configured as a parity data storage center, parity for the plurality of data storage centers is maintained asynchronously by at least one parity data storage center, and each of the plurality of data storage centers is configured to issue a parity read command.

18. The system of claim 17, each content map comprising:
    a data set field indicating the data set being stored;
    a source field indicating from which data storage center the data set originates;
    a location field indicating whether the data set is in a buffer or in a storage unit;

a state flag field indicating whether a local parity of the data set is complete, whether a global copy of the data set is complete and whether a global protection of the data set is complete;

a recovery flag field indicating whether the data set is to be forwarded to the parity data storage center;

a recovery destination field indicating a location of the parity data storage center; and a recovery source field indicating a given data storage center of the plurality of data storage centers for recovery.

19. The system of claim 18, each parity map comprising:

an identification of the first data storage center configured to store the data set;

an identification of the second data storage center configured to store the data set; and an identification of the parity data storage center configured to maintain parity for the plurality of data storage centers.

* * * * *